United States Patent [19]

Cianciosi et al.

[11] Patent Number: 5,263,128
[45] Date of Patent: Nov. 16, 1993

[54] METHOD AND APPARATUS FOR BEAT ELIMINATION FOR AN RF SIGNAL MODULATED WITH A PULSED SIGNAL OF SIMILAR FREQUENCY

[75] Inventors: Michael S. Cianciosi; Robert P. Loce, both of Rochester, N.Y.; Jean-Michel Guerin, Glendale, Calif.; Aron Nacman, Rochester, N.Y.

[73] Assignee: Xerox Corporation, Rochester, N.Y.

[21] Appl. No.: 799,265

[22] Filed: Nov. 27, 1991

[51] Int. Cl.⁵ .............................................. G06F 3/12
[52] U.S. Cl. ..................................... 395/113; 395/101
[58] Field of Search ................ 395/101, 113; 328/133, 328/134–139, 156–158; 331/20, 25, 37, 40; 358/19, 20

[56] References Cited

U.S. PATENT DOCUMENTS

| | | |
|---|---|---|
| 3,339,157 | 8/1967 | Fiorino . |
| 4,004,209 | 1/1977 | Lawson, Jr. . |
| 4,205,348 | 5/1980 | DeBenedictis et al. . |
| 4,213,158 | 7/1980 | DeBenedictis . |
| 4,357,627 | 11/1982 | Johnson . |
| 4,639,073 | 1/1987 | Yip et al. . |
| 4,971,413 | 11/1990 | Inoue . |

FOREIGN PATENT DOCUMENTS

| | | |
|---|---|---|
| 0134648 | 3/1984 | European Pat. Off. . |
| 58-13069 | 1/1983 | Japan . |
| 58-60877 | 4/1983 | Japan . |
| 60-114071 | 6/1985 | Japan . |

OTHER PUBLICATIONS

Electronics Mar. 22, 1965 pp. 97–108.

Primary Examiner—Robert L. Richardson
Attorney, Agent, or Firm—Oliff & Berridge

[57] ABSTRACT

A method and apparatus which eliminates beat like artifacts that occur when an RF signal is mixed with a pulsed signal of similar, but not identical, frequency to the RF signal. A controller for synchronizing the phase of a RF carrier signal to a video signal provides beat elimination in a high pixel rate laser printer. The video signal and RF carrier signal are multiplied and sent to an acousto-optic modulator for pulsing a uniform burst of energy in the form of a laser beam to a photoconductor. The controller may include a synchronous gateable crystal oscillator with logic such as TTL, CMOS, ECL or equivalent logic functions using discrete transistors, where the synchronous gateable crystal oscillator is frequency dependent upon a laser printing speed. Eliminating imaging defects such as variable pixel width and density provides a sharper, uniform pixel printout.

26 Claims, 6 Drawing Sheets

METHOD AND APPARATUS FOR BEAT ELIMINATION FOR AN RF SIGNAL MODULATED WITH A PULSED SIGNAL OF SIMILAR FREQUENCY

BACKGROUND OF THE INVENTION

1. Field of the Invention

This invention relates to improvements in methods and apparatuses for controlling the phase and amplitude of an RF (acoustic) carrier which is modulated with a similar frequency pulsed signal and, more particularly, to improvements in acousto-optic control circuitry to provide uniform laser printing.

2. Description of the Related Art

Laser printing technology provides a pulsed imaging raster output scanner for providing an acoustic carrier which can be modulated with a video signal, prompting a laser light output to image an optical grating onto a photoconductor. The video signal and the RF carrier are processed to provide a single modulated carrier. Typically, the video signal is a digital pulse which, in the logically high state, triggers a burst of RF energy to an acousto-optic (AO) modulator for activating a crystal within the modulator whereupon, when the RF carrier is passed into the crystal by a transducer, the RF carrier becomes an acoustic carrier. When a region of the crystal within the AO modulator is activated, a laser light beam is passed through that region and imaged onto a photoconductive surface to photodischarge a pixel site. When the video signal goes to the logically low state, the RF carrier is not allowed to pass energy to the AO modulator. Thus, the crystal within the modulator is deactivated, and the laser light beam is turned-off until the next activation by a logically high video signal.

The video frequency of a raster output scanner is typically lower than the acoustic carrier frequency, but for high speed raster output scanners, the frequency of the video signal can approach the frequency of the acoustic carrier. For example, in one color printing system, the minimum pixel time available during scanning is 11.4 nanoseconds whereas the period of the RF signal is approximately 20 nanoseconds, so that approximately two periods of the video signal occur during each period of the acoustic waveform. When the frequency of the video signal and the frequency of the acoustic carrier are similar to one another, beat-like artifacts appear in the optical pattern that is output by the AO modulator, resulting in non-uniform printed pixels that vary in appearance periodically with the phase of the acoustic carrier, such that the width and density of the printed pixels are inconsistent. The present invention adjusts the phase of the carrier signal to eliminate the beat-like artifacts.

In U.S. Pat. No. 4,639,073 to Yip et al, an electro-optic pulse imaging raster output scanner is described that includes means for pulsing modulator electrodes at a speed equal to the speed of a scanning polygon and in a direction opposite to the polygon scanning direction to obviate image blur. Yip et al recognizes enhanced image clarity and reduced image blurring by matching the velocity of the acoustic pulse with the velocity of the spot on a recording member where a beam is focused. (In the literature of the field, this is referred to as a "pulsed imaging scanner."). However, phase synchronization between video and acoustic signals having similar, but not identical, frequencies at the start-up time of the modulator, is not described or suggested in the reference.

A synchronizing signal for providing clear printing by controlling the modulation starting time and ending time of a laser beam which scans on a photosensitive drum is described in Japanese Patent Application No. 58-13069 to Nagaoke. The Width of a square wave synchronizing signal establishes the duration of a laser beam. In Japanese Patent Application No. 60-114071, a device for generating a light beam scan synchronizing signal is described for starting a light beam scan upon the fall of a signal outputted from a comparator. In both Japan 58-13069 and Japan 60-114071, there is no description or suggestion of synchronizing the phase of a video and acoustic signal having similar but not identical frequencies in order to affect beat elimination in an acoustooptic modulator.

SUMMARY OF THE INVENTION

An object of the invention is to provide a method and apparatus for mixing a RF signal with a pulsed signal to provide a predictable phase of the RF signal at the beginning of each pulse of the pulsed signal, given that the RF signal and the pulsed signal have similar but not identical frequencies.

Another object of the invention is to provide a method and apparatus for pulsed imaging raster output scanner beat elimination for a phase controlled video modulator circuit.

A further object of the invention is to provide a method and apparatus for synchronizing an RF burst of energy with each logically high output of a pulsed waveform.

The present invention overcomes problems in the prior art by providing a method and apparatus which eliminates beat-like artifacts that occur when an RF signal is mixed with a pulsed signal of similar, but not identical, frequency to the RF signal.

A method and apparatus for beat elimination for an RF signal modulated with a pulsed signal of similar frequency includes phase control means for synchronizing a phase of a RF signal with a pulsed signal, the pulsed signal having a frequency similar, but not identical, to a frequency of the RF signal, the method and apparatus further comprising amplitude control means for controlling an amplitude of the RF signal to compensate for losses in a gain of the RF signal.

The scope of the present invention and the manner in which it addresses the problems associated with prior art methods and apparatuses will become more readily apparent from the following detailed description when taken in conjunction with the accompanying drawings and claims.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENT

Figure 1:
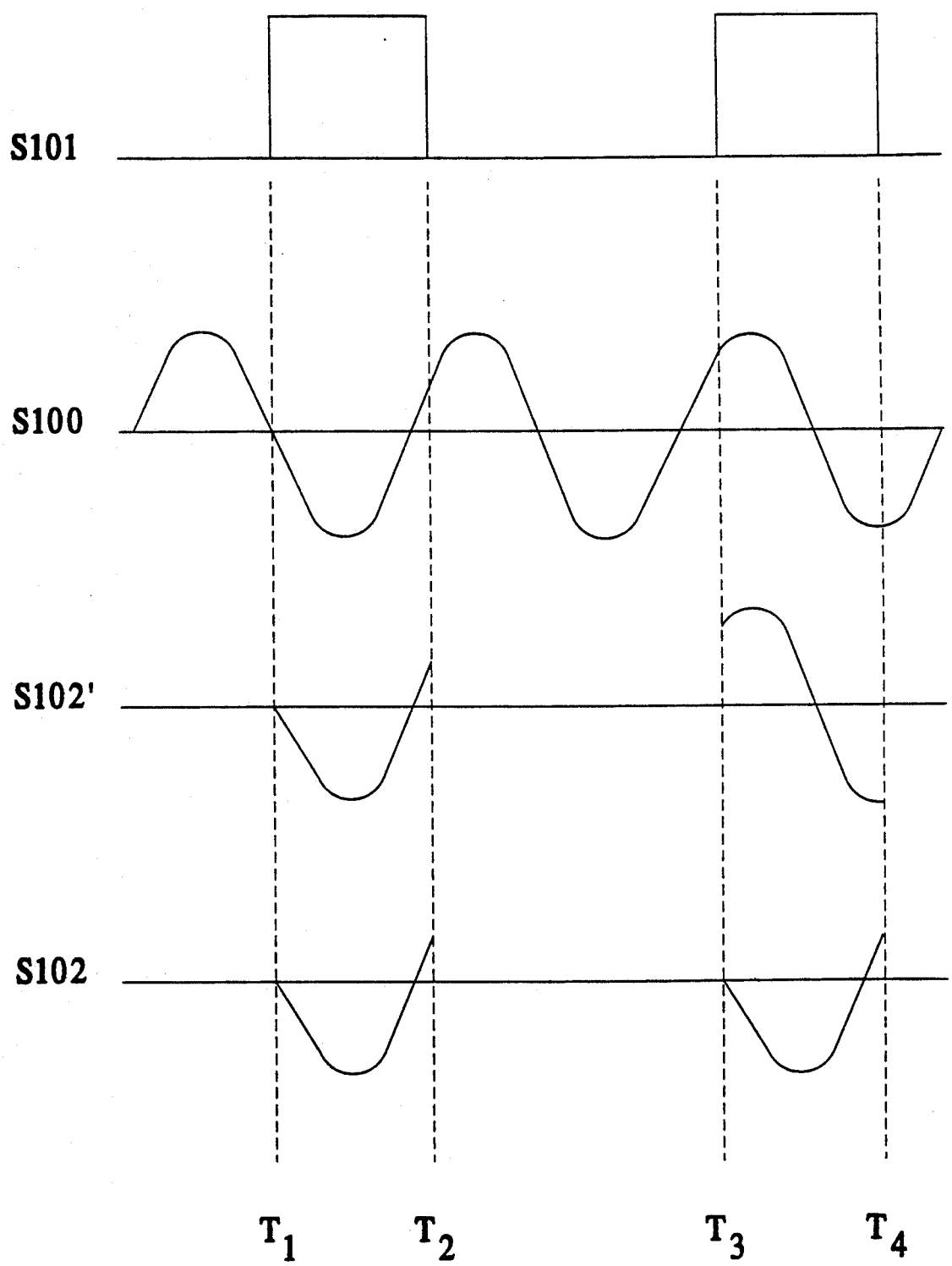
FIG. 1 is a timing diagram of signals generated according to the present invention.

FIG. 1 is a timing diagram of signals generated according to the invention and includes a signal S102, that is not generated by the FIG. 1 apparatus. A pulsed signal S101 has a period $T_3-T_1$ and a frequency approximately one-half that of RF signal S100. Multiplying S101 and S100 without phase or amplitude control, as commonly performed by the prior art, results in a waveform S102' that provides an RF signal burst during times $T_2-T_1$ and $T_4-T_3$, i.e., when S101 is digitally high. When S101 is digitally low, as during time $T_3-T_2$, no RF signal is allowed to pass, i.e., S102' has an amplitude of zero. Examination of the RF signal S102' during times $T_2-T_1$ and $T_4-T_3$ indicates that S102' is phase and frequency dependent upon S101. Hence, the RF signal and the amount of RF energy available during times when S101 is logically high will vary, providing non-uniform RF signals and non-uniform pulsed RF energy bursts. Controlling the phase and amplitude of the RF signal S100, when combined with digital pulse signal S101 in accordance with the present invention, results in signal S102 (in contrast to signal S102') that has the same phase, amplitude and RF energy for the RF signal during any time when the digital pulse is high.

Figure 2:
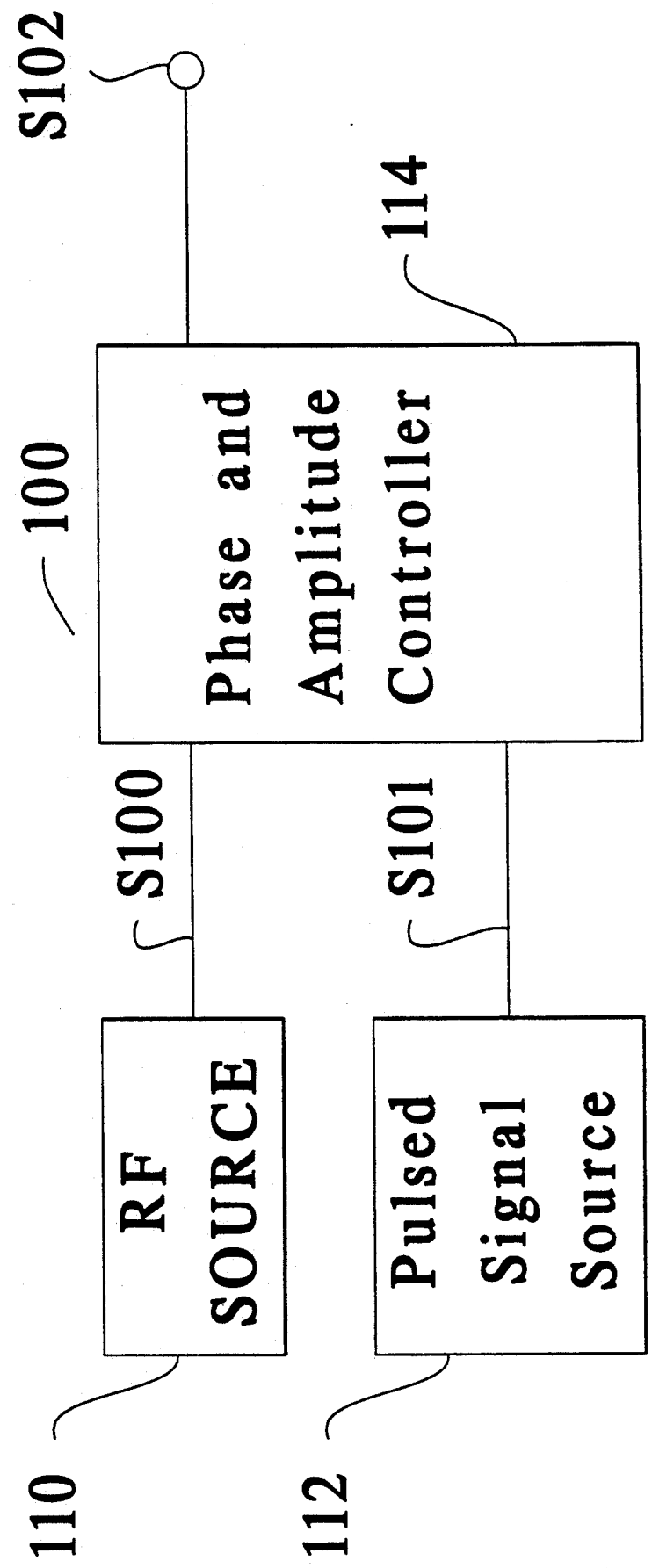
FIG. 2 is a simplified block diagram of a first preferred embodiment of an apparatus for eliminating beat-like artifacts that occur when an RF signal is mixed with a pulsed signal of similar, but not identical, frequency to the RF signal.

In the first preferred embodiment of FIG. 2, an apparatus 100 for eliminating beat-like artifacts is described in detail. In apparatus 100, an RF signal S100 is generated at an RF source 110 and coupled to a phase and amplitude controller 114. A pulsed signal S101 with a frequency similar, but not identical, to a frequency of RF signals 100, is generated at a pulsed signal source 112 and the pulsed signal S101 is also coupled to the phase and amplitude controller 114. A variety of controller 114 circuitry as described in the embodiments to follow, is available to provide phase control such that a phase of the RF signal S100 will be the same at a leading edge of each pulsed signal S101. The controller 114 also provides amplitude control by compensating for circuit losses in the amplitude of the RF signal S100. A phase and amplitude-controlled RF signal S102 is output from the phase and amplitude controller 114 as the result of multiplying the phase and amplitude-controlled RF signal S100 with pulsed signal S101 in controller 114.

Figure 3:
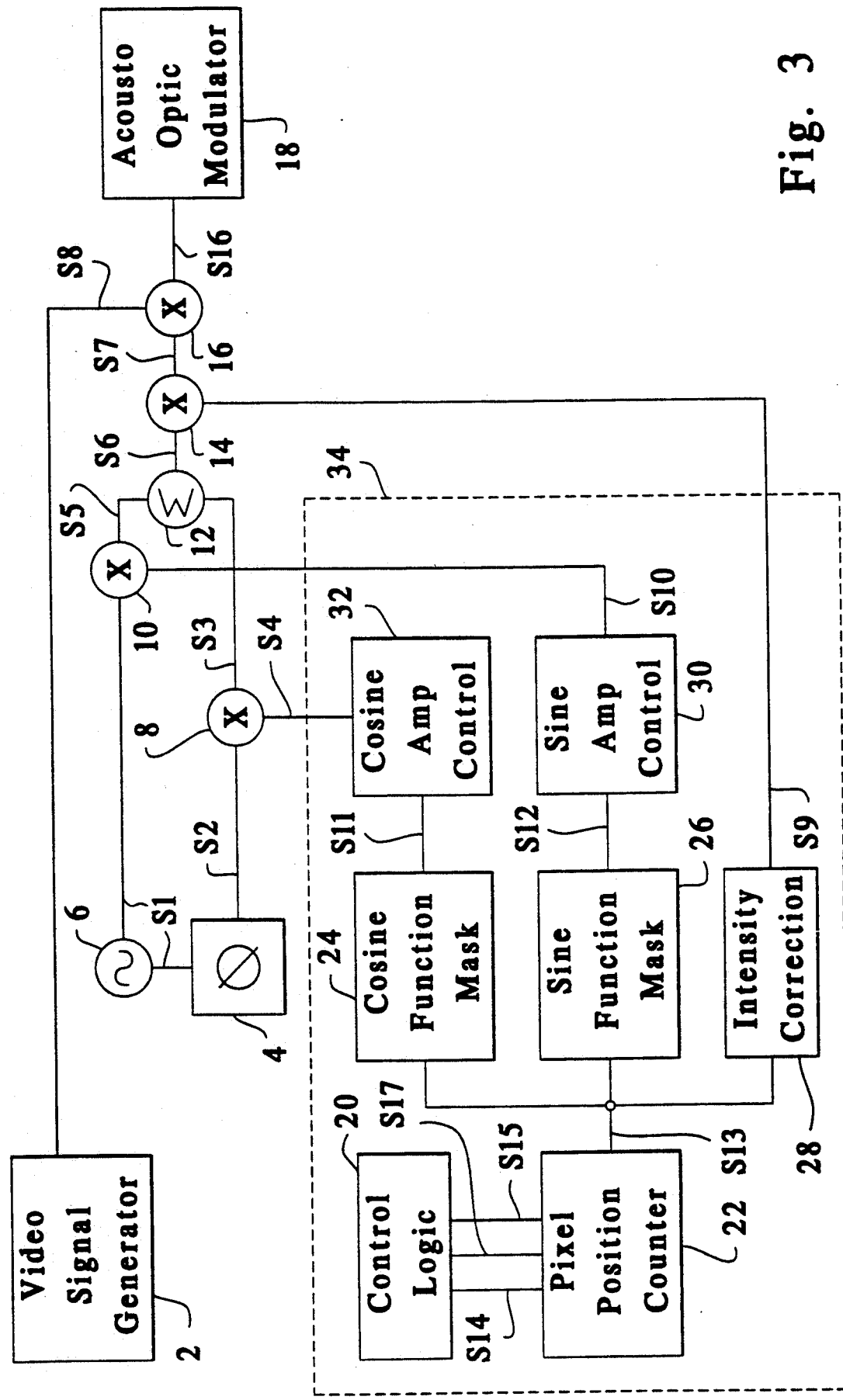
FIG. 3 is a circuit diagram of the first preferred embodiment of an apparatus according to the present invention, specifically a phase-controlled video modulator circuit for pulsed imaging raster output scanner beat elimination.

In FIG. 3, a detailed schematic of the apparatus of FIG. 1 is shown, where the phase and amplitude are set by a method that may be referred to as "quadrature mixing". The apparatus includes a controller 34 which provides DC biasing for a sine carrier signal S1 and the cosine carrier signal S2 to compensate for amplitude variations due to circuit losses. A sine function mask 26 provides a sine DC bias signal S12 that is secondarily adjusted by a sine amplitude controller 30 to produce a sine control signal S10. A cosine function mask 24 provides a cosine DC bias signal S11 which is secondarily adjusted by a cosine amplitude controller 32 to produce a cosine control signal S4. Both the sine and cosine control signals S10 and S4 are frequency dependent upon a pixel position output signal S13 as controlled by a control logic 20.

A mathematical depiction of the sine and cosine function masks 26 and 24 is provided with the cosine carrier signal S2 being a time dependent function f(t) and the sine carrier S1 being a time dependent function g(t). In a facet tracking raster output scanner, the frequency of acoustic carrier, v(t), varies in time. An amplitude variation, a(t), for the cosine carrier signal S2 compensates for optical falloff across the field, as does an amplitude variation b(t) for the sine carrier signal S1. The amplitude control could be included in the cosine function mask 24 and the sine function mask 26, but the preferred embodiment of FIG. 3 provides an independent cosine amplitude controller 32 and sine amplitude controller 30. The cosine carrier signal S2 is represented as by f(t):

$$f(t) = a(t) \cos (2\pi v(t)t) \qquad (1)$$

and the sine carrier signal S1 is represented by g(t) as:

$$\begin{aligned} g(t) &= b(t)\cos\left(2\pi v(t)t + \frac{\pi}{2}\right) \\ &= b(t)\sin(2\pi v(t)t). \end{aligned} \qquad (2)$$

The summed signal, h(t), is the result of summing the sine and cosine carrier signals and is represented as:

$$\begin{aligned} h(t) &= f(t) + g(t) \\ &= (a(t)^2 + b(t)^2)^{\frac{1}{2}}\cos(2\pi v(t)t + \tan^{-1}(b(t)/a(t)). \end{aligned} \qquad (3)$$

To achieve a proper and constant phase at a turn-on time, $n\Delta t$, the condition c is set that:

$$c = 2\pi v(t)t + \tan^{-1}(b(t)/a(t)) \qquad (4)$$

where $\Delta t$ is a pixel time, n is a pixel count, and c is a constant. The requirement that h(t) has a chosen amplitude, d, is written as:

$$d = (a(n\Delta t)^2 + b(n\Delta t)^2)^{\frac{1}{2}} \qquad (5)$$

The cosine function mask $a(n\Delta t)$ and the sine function mask $b(n\Delta t)$ can thus be expressed from the combination of equations (4) and (5) as:

$$\begin{aligned} a(n\Delta t) &= \pm d \{1 + \tan^2(c - 2\pi v(n\Delta t)n\Delta t)\}^{\frac{1}{2}} \\ &= \pm d\cos(c - 2\pi v(n\Delta t)n\Delta t) \end{aligned} \qquad (6)$$

$$\begin{aligned} b(n\Delta t) &= a(n\Delta t)\tan(c - 2\pi v(n\Delta t)n\Delta t) \\ &= \pm d\sin(c - 2\pi v(n\Delta t)n\Delta t) \end{aligned} \qquad (7)$$

Exact setting of the amplitudes in the function masks for high speed raster output scanners will eliminate the imaging defects discussed above whereas, slower electronics may sufficiently suppress the beat phenomenon without necessitating exact amplitude settings.

Once the phase of the sine and cosine carrier signals are properly oriented with the video signal, and the amplitudes of the sine and cosine carrier signals are made uniform, then the cosine control signal S4 is multiplied with the cosine carrier signal S2 in second multiplier 8 resulting in a second multiplier output signal S3, and the sine control signal S10 is multiplied with the sine carrier signal S1 in first multiplier 10, resulting in a first multiplier output signal S5. The first multiplier output signal S5 and the second multiplier output signal S3 are then summed in summer 12, resulting in a sum signal S6. In order to compensate for optical falloff across the field, sum signal S6 is multiplied in fourth multiplier 14 with a scan line intensity correction signal S9 from a scan line intensity correction circuit 28 within controller 34 to produce a modified sum signal S7. The scan line intensity correction signal S9 is synchronized in a scan line intensity correction circuit 28 by a pixel position output signal S13. The modified sum signal S7 is multiplied in third multiplier 16 with the video signal S8 from video signal generator 2. A third multiplier output signal S16 is output from the third multiplier 16 and input to an acousto-optic modulator 18 which thereupon activates a laser beam to be emitted upon a photoconductor (not shown). The acousto-optic modulator will always operate with an RF signal of the same amplitude and phase during each video pulse, thus the RF energy and the laser light beam will be uniform in intensity. The result is uniform pixel printouts of the same width and density.

The first preferred embodiment, as detailed in FIG. 3, includes phase-controlled ROS beat elimination by summing the sine carrier signal S1 and the cosine carrier signal S2, both carrier signals having specifically chosen amplitudes which are directly related to an amount of laser energy necessary for a laser beam to properly discharge a pixel on a photoconductive surface. The amount of RF energy pulsed from the acoustic carrier signal is directly proportional to the requisite laser energy in that the laser energy is supplied by RF energy bursts in the AO modulator. The specifically chosen amplitudes of the sine and cosine carrier signals S1 and S2 will vary according to the laser energy required. The amplitudes necessary for the sine and cosine carrier signals S1 and S2 to provide the required laser energy can be determined within the function masks as described hereinbefore, or can be stored in a look-up table in computer memory. A look-up table of known amplitudes for desired laser energy outputs is also useful as an acoustic carrier calibration device.

Phase control is accomplished where the sinusoidal RF generator 6 generates the sine carrier signal S1 which is phase shifted by phase shifter 4 to generate the cosine carrier signal S2, which lags S1 by 90°. The controller 34 controls a phase and an amplitude of both sine carrier signal S1 and cosine carrier signal S2. Control logic 20 provides a line sync signal S14, a pixel clock signal S15 and a page sync signal S17. The line sync signal S14 provides timing and synchronization for scanning each line in an image; the pixel clock signal S15 provides timing and synchronization for scanning each pixel in an image; and the page sync signal S17 provides timing and synchronization for scanning each page in an image. The pixel position counter 22 provides contemporaneous pixel positioning information during scanning.

Figure 4:
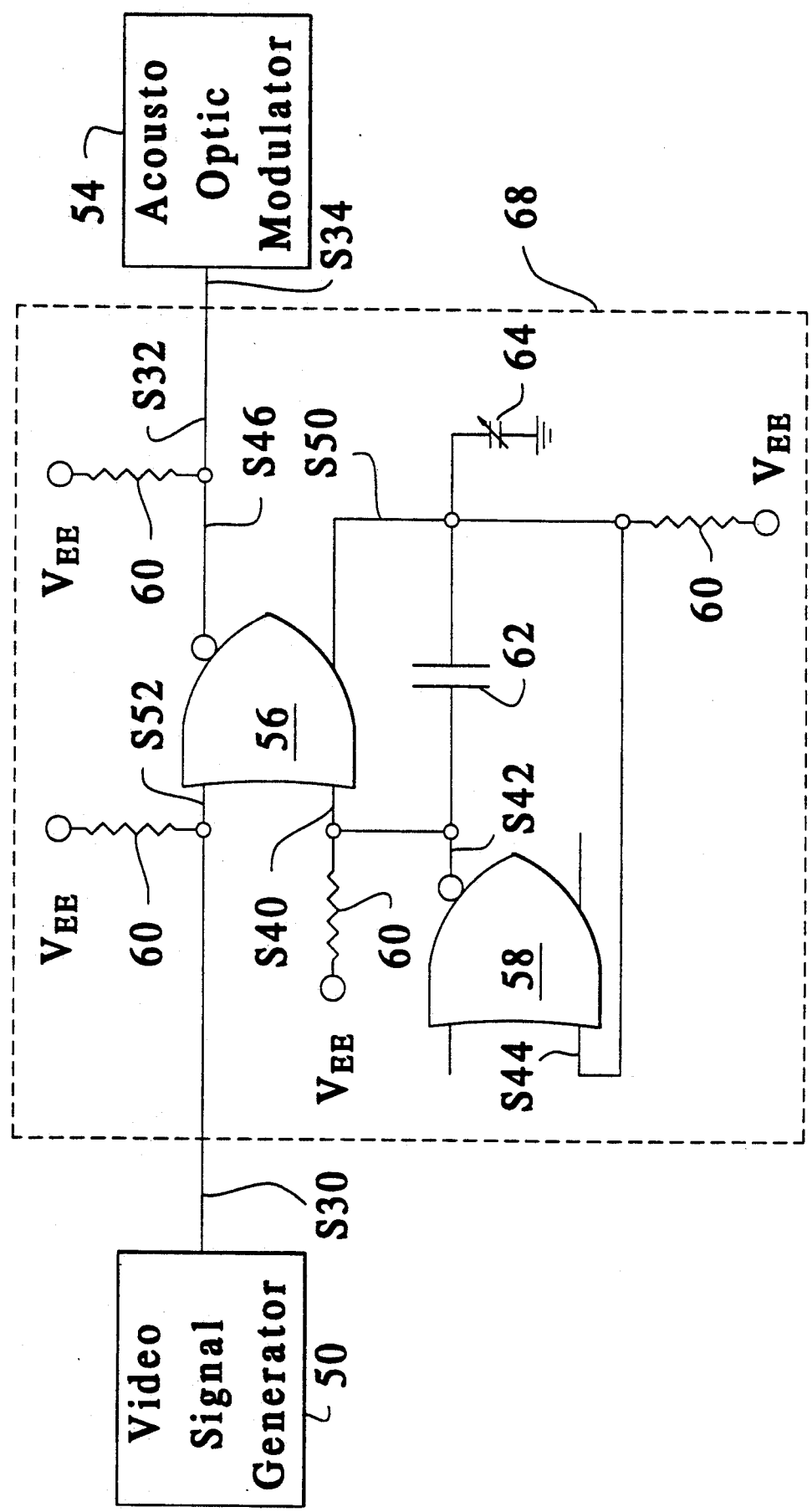
FIG. 4 is a circuit diagram of a second preferred embodiment of an apparatus according to the present invention, specifically a phase-controlled video modulator circuit using a synchronous gateable crystal oscillator for pulsed imaging raster output scanner beat elimination.

A second preferred embodiment of an apparatus according to the present invention is shown in FIG. 4 using a synchronous gateable crystal oscillator 68 (SGCO) for phase control. A video modulated burst of RF energy (represented by an output signal S34) is generated by the oscillator circuit 68 gated by video signal S32. Output signal S34 is input to acousto-optic modulator 54 for driving a laser beam (not shown) onto a photoconductor. Oscillator 68 provides consistent phase of output signal (i.e., RF carrier) S34 gated by video signal S30. The logic used in controller 68, is not limited to the SGCO circuit shown. Rather, the logic is RF dependent upon the speed of the laser printer being used thus, for example, TTL, CMOS, ECL or equivalent logic functions with discrete transistors could be used.

When the video signal S30 from video signal generator 50 is gated in HIGH at S52 of NOR gate 56, the output S50 of the NOR gate 56 will be HIGH, S44 will be HIGH and S40, S42, and S46 will be LOW. The SCGO will be in a stable state and not oscillating. When the video signal S30 is taken to a logic LOW at S52 of NOR gate 56, since S40 is LOW, S46 goes HIGH and S50 goes LOW within a propagation delay time of the logic gate. While S50 is LOW, S44 is LOW and S42 goes HIGH within the propagation delay time of the logic gate. This causes S46 to go LOW and S50 to go HIGH within the propagation delay time of the logic gate. With S50 HIGH, S44 is HIGH and S42 goes low within the propagation delay time of the logic gate causing S46 to again go HIGH and S50 again to go LOW. The SGCO is now in an unstable state and will oscillate at a frequency dependent on the logic signal propagation delays caused by circuit components. If signal S52 is taken to logic HIGH, the output of the NOR gate will also be HIGH, S44 will be high, S40, S42 and S46 will be LOW, and the circuit will again be stable and not oscillate. In this stable state, whenever S52 goes LOW, S46 goes HIGH within the time delays of the circuit components. A crystal 62 always starts with a same time or phase relationship to signal S52 and thus is phase synchronous with signal S52.

Resistors 60 and tuning capacitor 64 are selected to set an RC constant to delay logic signals in addition to the logic gate delays. This allows the resonant frequency of the SGCO circuit to be tuned. By introducing the crystal 62 into the circuit and setting the RC constant such as to provide the resonant frequency close to the crystal frequency, or one of its overtone frequencies, the frequency of oscillation will be that of the crystal within a small detuning factor caused by the reactive circuit components, i.e., the capacitance and inductance.

Figure 5:
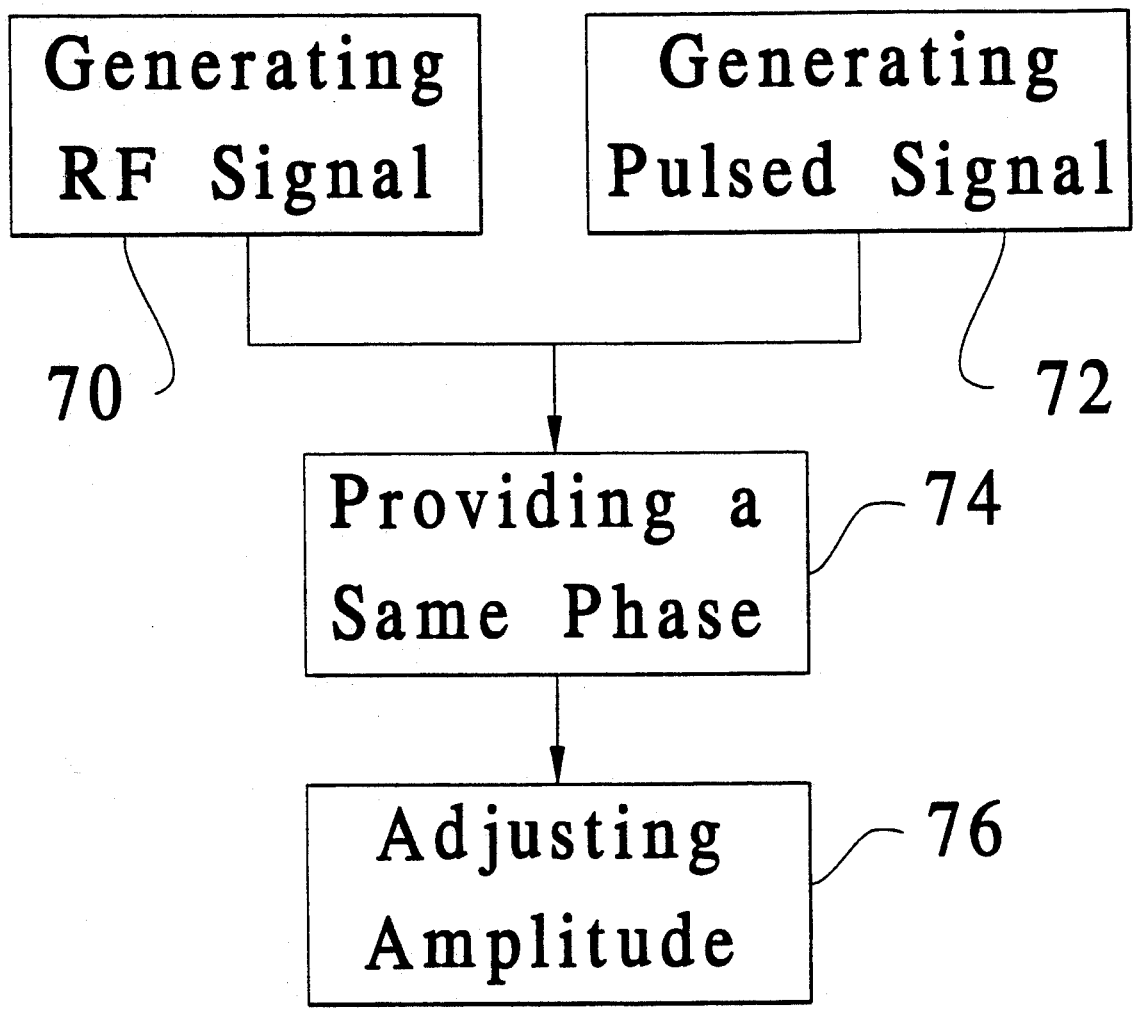
FIG. 5 is a simplified flowchart diagram of a first preferred embodiment of a method according to the present invention.

FIG. 5 is a simplified flowchart diagram of a first preferred embodiment of a method according to the present invention. In order to eliminate beat like artifacts when an RF signal is modulated with a pulsed signal, first an RF signal is generated in step 70, and a pulsed signal is generated in step 72. Step 74 provides phase synchronization of the RF signal at a leading edge of each pulse of the pulsed signal. An amplitude of the RF signal is adjusted at step 76 to compensate for RF signal amplitude losses.

Figure 6:
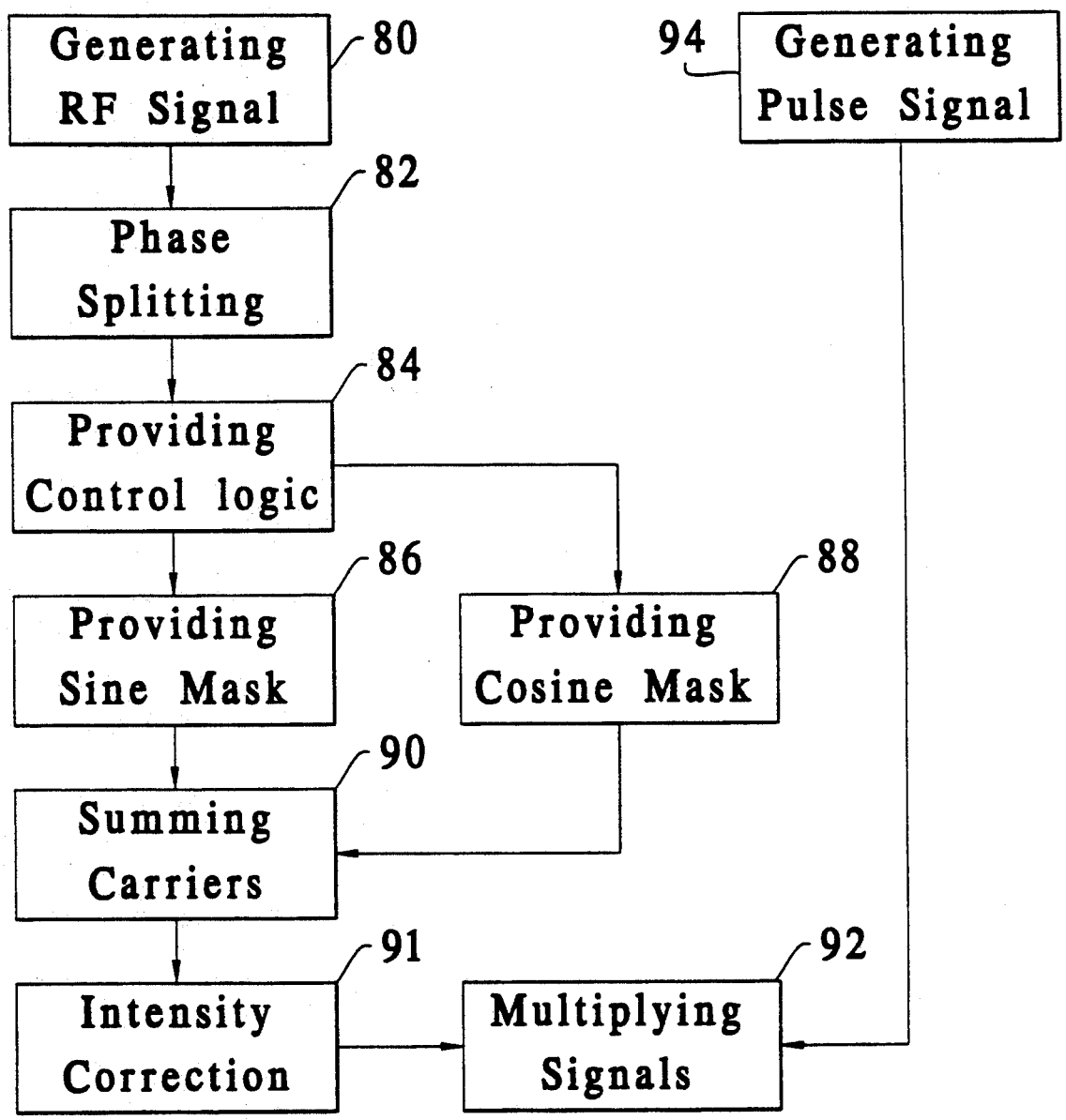
FIG. 6 is a detailed flowchart diagram of a first preferred embodiment of a method according to the present invention.

In FIG. 6, a detailed schematic of a first preferred embodiment of a method according to the present invention generates an RF signal in step 80 and a pulsed signal in step 94. Phase splitting in step 82 splits the RF signal into a sine carrier signal and a cosine carrier signal. Step 84 provides control logic for phase control of the sine carrier signal and the cosine carrier signal. Amplitude control of the sine carrier signal is provided in a sine function mask in step 86 and amplitude control of the cosine carrier signal is provided in a cosine function mask in step 88. After the amplitudes of the sine and cosine carrier signals have been adjusted by DC biasing using appropriate trigonometric function mask circuitry or accessing stored look-up table amplitude variations values. Thereafter, the sine and cosine carrier signals are summed into a sum signal in step 90. The sum signal obtained in step 90 (which is intensity corrected in step 91) and the pulsed signal obtained in step 94 are then multiplied in step 92, resulting in a multiplied signal that includes the phase synchronization for each RF signal component at each leading edge of a pulsed signal component. The result of the process is a uniform burst of RF energy, i.e. a uniform RF signal whenever the pulsed signal is high. Conversely, no RF signal is transferred when the pulsed signal component of the multiplied signal is low.

The method and apparatus of the present invention can be used in conjunction with, for example, a phase-controlled video modulator for pulsed imaging ROS beat elimination in a laser printing system where the image defect phenomenon is particularly acute as a result of video and acoustic signals being mixed that have similar frequencies. The imaging defects would be eliminated if the phase of the acoustic carrier was identical at all turn-on times. Thus, a beat pattern would not be created, and all pixels resulting from a laser printout would have pixels of the same width and density, resulting from the same acoustic wave intensity pattern.

While the invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A phase and amplitude-controlled video modulator circuit for pulsed imaging raster output scanner beat elimination, said circuit comprising:
    a 90° phase splitter means for splitting an RF carrier signal into a sine carrier signal and a cosine carrier signal;
    a controller means for controlling a phase and an amplitude of the sine carrier signal and a phase and an amplitude of the cosine carrier signal;
    a first multiplier means for multiplying the sine carrier signal with a sine control signal, said first multiplier means producing a first multiplier output signal;
    a second multiplier means for multiplying the cosine carrier signal with a cosine control signal, said second multiplier means producing a second multiplier output signal;
    a summer means for summing the first multiplier output signal and the second multiplier output signal to produce a sum signal;
    a third multiplier means for multiplying the modified sum signal with a video signal, said third multiplier means producing a third multiplier output signal; and
    an acoustic transducer with crystal, said transducer producing an acoustic carrier with an acoustic carrier frequency using the third multiplier output signal, said acoustic carrier modulating a light beam that is uniformly imaged onto a photoconductor.

2. The phase controlled video modulator circuit as claimed in claim 1, wherein the controller means further comprises signal providing means for providing:
    a pixel clock signal identical in frequency to the video signal, the pixel clock signal controlling the phase of the sine carrier signal and the cosine carrier signal such that the phase of the sine carrier signal and the phase of the cosine carrier signal are identical for each leading edge of the video signal;
    a line sync signal for synchronizing a length of each scan line; and
    a page sync signal for synchronizing a length of a number of scan lines on a page, said signal providing means comprising a control logic circuit.

3. The phase-controlled video modulator circuit of claim 2, wherein the controller means further comprises a pixel position counter means for determining an instantaneous pixel position address, the pixel position counter means receiving the pixel clock signal, the line sync signal and the page sync signal from the signal providing means.

4. The phase-controlled video modulator circuit of claim 3, wherein the controller means further comprises:
    a sine function mask means for determining a sine DC bias current to adjust an amplitude of the sine carrier signal, the sine function mask means receiving a pixel position output signal from the pixel position counter means;
    a sine amplitude control means for receiving and adjusting the sine DC bias current from the sine function mask means, said sine amplitude control means forming the sine control signal, said sine amplitude control means being coupled to the first multiplier means;
    a cosine function mask means for determining a cosine DC bias current to adjust an amplitude of the cosine carrier signal, the cosine function mask means receiving a pixel position output signal from the pixel position counter means; and
    a cosine amplitude control means for receiving and adjusting the cosine DC bias current from the cosine function mask means, said cosine amplitude control means forming the cosine control signal, said cosine amplitude control means being coupled to the second multiplier means.

5. The phase-controlled video modulator circuit of claim 1, further comprising:
    a fourth multiplier means connected between the summer and the third multiplier means, said fourth multiplier means multiplying the sum signal provided by the summer means with a scan line intensity correction signal, said fourth multiplier means producing a modified sum signal for input to the third multiplier means; and
    a scan line intensity correction means for controlling an amplitude variation of the sum signal, the scan line intensity correction means receiving a pixel position output signal from a pixel position counter and outputting the scan line intensity correction signal to the fourth multiplier means.

6. The phase-controlled video modulator circuit as claimed in claim 1, wherein the acousto-optic modulator means drives a laser beam in a laser printing system.

7. The phase and amplitude controlled video modulator circuit of claim 1, wherein the controller means further comprises storage means for storing:

a sine carrier look-up table containing precalculated DC bias values to compensate for amplitude variations between the sine carrier signal and the acoustic carrier signal; and a cosine carrier look-up table containing precalculated DC bias values to compensate for amplitude variations between the cosine carrier signal and the acoustic carrier signal.

8. A phase-controlled video modulator circuit for pulsed imaging raster output scanner beat elimination, said circuit comprising:

control means for synchronizing a phase of a video signal with a phase of a RF carrier signal resulting in a synchronized video signal;

multiplier means for multiplying the synchronized video signal with the RF carrier signal, said multiplier means providing a multiplied signal; and acousto-optic modulator means for modulating the multiplied signal from acoustic energy to optical energy.

9. The phase-controlled video modulator circuit of claim 8, wherein the acousto-optic modulator means drives a laser beam in a laser printing system.

10. The phase-controlled video modulator circuit of claim 8, wherein the control means comprises a synchronous gateable crystal oscillator means comprising a crystal tuned to a resonant frequency for synchronizing the phase of the acoustic carrier signal with the video signal.

11. The phase-controlled video modulator circuit of claim 10, wherein the synchronous gateable crystal oscillator circuit includes one of TTL logic, CMOS logic, ECL logic and logic function equivalents using discrete transistors.

12. The phase-controlled video modulator circuit of claim 10, wherein when an input to the synchronous gateable crystal oscillator means is HIGH, the circuit is stable and non-oscillating.

13. The phase-controlled video modulator circuit of claim 12, wherein when the input to the synchronous gateable crystal oscillator means is LOW, the circuit is unstable and oscillating.

14. A method for beat elimination of a RF signal modulated with a pulsed signal having a frequency similar, but not identical, to a frequency of the RF signal, said method comprising the steps of:

controlling the phase of RF signal by forming an identical phase of the RF signal at a leading edge of each pulse of the pulsed signal;

adjusting an amplitude of the RF signal to compensate for RF signal amplitude losses; and combining the adjusted RF signal and the pulse signal to produce a final RF signal that is missing the beat-like artifact, the final RF signal having an identical phase for each RF signal component at the leading edge of a component of the pulsed signal.

15. The method of claim 14, wherein the step of providing an identical phase further comprises using a synchronous gateable crystal oscillator circuit 16. The method of claim 14, wherein the step of providing an identical phase further comprises using a RF signal from a raster output scanner.

17. The method of claim 14, wherein the steps of providing an identical phase and adjusting an amplitude comprise using one of TTL logic, ECL logic, CMOS logic and logic function equivalents using discrete transistors.

18. The method of claim 14, wherein said amplitude adjustment step includes accessing a look-up table of amplitude values.

19. The method of claim 14, wherein the pulsed signal is a video signal.

20. The method of claim 19, further comprising modulating the RF signal and the video signal.

21. The method of claim 19, further comprising outputting a uniform RF energy burst for a duration of each pulse of the video signal.

22. The method of claim 21, wherein said outputting includes outputting a uniform RF energy burst for a duration of each pulse of the video signal to a laser printer.

23. A method for beat elimination in a pulsed imaging raster output scanner circuit of a RF signal modulated with a pulsed signal having a frequency similar, but not identical, to a frequency of the RF signal, said method comprising the steps of:

phase splitting a RF signal into a sine carrier signal and a cosine carrier signal;

controlling a phase of the sine carrier signal and the cosine carrier signal;

controlling the amplitude of the sine carrier signal;

controlling the amplitude of the cosine carrier signal;

summing the amplitude-controlled sine carrier signal and the amplitude-controlled cosine carrier signal to provide a sum signal; and multiplying the sum signal by the pulsed signal to provide a multiplied signal having an identical phase for each RF signal component at each leading edge of a component of the pulsed signal.

24. The method of claim 23, further comprising a step of adjusting a scan line intensity for amplitude correction of the sum signal.

25. The method of claim 23, further comprising laser printing, the multiplied signal.

26. The method of claim 23, wherein the pulsed signal is a video signal and the step of multiplying the sum signal includes multiplying the sum signal by the video signal.

* * * * *